US012669213B1

(12) United States Patent
Xue

(10) Patent No.: US 12,669,213 B1
(45) Date of Patent: Jun. 30, 2026

(54) MOVABLE BRACKET

(71) Applicant: Shenzhen Huahanxing Technology Co., Ltd., Shenzhen (CN)

(72) Inventor: Wenfeng Xue, Shangrao (CN)

(73) Assignee: Shenzhen Huahanxing Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/387,147

(22) Filed: Nov. 12, 2025

(30) Foreign Application Priority Data

Nov. 5, 2025   (CN) .......................... 202522346698.9

(51) Int. Cl.
    *F16M 11/42*      (2006.01)
    *B62B 3/02*      (2006.01)
    *B62B 5/04*      (2006.01)
    *F16M 11/22*      (2006.01)

(52) U.S. Cl.
    CPC ............... *F16M 11/42* (2013.01); *B62B 3/02* (2013.01); *B62B 5/0476* (2013.01); *F16M 11/22* (2013.01)

(58) Field of Classification Search
    CPC .......... F16M 11/42; F16M 11/22; B62B 3/02; B62B 5/0476
    See application file for complete search history.

(56) References Cited

U.S. PATENT DOCUMENTS

| | | | | | |
|---|---|---|---|---|---|
| 520,319 | A | * | 5/1894 | Kynoch | B62B 5/0083 |
| | | | | | 280/35 |
| 1,300,533 | A | * | 4/1919 | Wessinger | A47C 17/80 |
| | | | | | 248/129 |

| | | | | | |
|---|---|---|---|---|---|
| 1,887,067 | A | * | 11/1932 | Pehrsson | B62B 5/0083 |
| | | | | | 280/35 |
| 2,003,162 | A | * | 5/1935 | Ulmer | B62B 3/02 |
| | | | | | 280/35 |
| 2,048,608 | A | * | 7/1936 | Holland | D06F 39/125 |
| | | | | | 248/167 |
| 2,534,367 | A | * | 12/1950 | Perrotta | B62B 5/0083 |
| | | | | | 211/49.1 |
| 3,807,750 | A | * | 4/1974 | Brown | B62B 3/02 |
| | | | | | 280/35 |

(Continued)

FOREIGN PATENT DOCUMENTS

| | | |
|---|---|---|
| CN | 214790298 U | 11/2021 |
| JP | 2008201346 A | 9/2008 |
| WO | 201814547 A1 | 8/2018 |

*Primary Examiner* — Jacob B Meyer

(57) ABSTRACT

A movable bracket comprises a supporting mechanism. A bottom part of the supporting mechanism is provided with a universal wheel assembly, the supporting mechanism comprises at least two relatively sliding supporting platforms, and an adjusting mechanism is arranged between every two adjacent supporting platforms to drive the two supporting platforms to approach or move away from each other to adjust a bearing width between the two supporting platforms. The supporting mechanism, the universal wheel assembly and the adjusting mechanism are cooperatively arranged, and the width of the supporting platforms is adjusted by the adjusting mechanism, so that the movable bracket is adapted to electrical appliances with different widths and sizes, thus achieving an effect of one bracket for multi-purposes, reducing a purchase cost of a user, having strong practicability, satisfying bearing requirements of different electrical appliances, and bringing a better use experience to the user.

8 Claims, 6 Drawing Sheets

(56)　　　　　References Cited

U.S. PATENT DOCUMENTS

| | | | | |
|---|---|---|---|---|
| 3,871,676 A * | 3/1975 | Renard | A45C 13/385 | 280/659 |
| 3,923,318 A * | 12/1975 | Renard | A45C 13/385 | 280/35 |
| 3,963,256 A * | 6/1976 | Stafford | A45C 13/385 | 280/35 |
| 3,964,762 A * | 6/1976 | Adams | B62B 3/04 | D34/17 |
| 4,166,638 A * | 9/1979 | De Prado | B62D 21/14 | 280/638 |
| 4,302,023 A * | 11/1981 | Kiesz | B62B 3/02 | 108/106 |
| 4,332,366 A * | 6/1982 | Descals Munt | B23Q 1/03 | 248/172 |
| 4,382,637 A * | 5/1983 | Blackburn | F16C 29/046 | 384/49 |
| 4,804,162 A * | 2/1989 | Rice | F16M 11/046 | 248/129 |
| 4,969,657 A * | 11/1990 | Kaufmann | B62B 5/0083 | 248/165 |
| 5,035,445 A * | 7/1991 | Poulin | B60T 1/14 | 280/79.11 |
| 5,249,823 A * | 10/1993 | McCoy | B62B 3/02 | 280/87.01 |
| 5,350,151 A * | 9/1994 | Aoki | B60B 33/0094 | 248/677 |
| D370,109 S * | 5/1996 | Hodges | D34/31 | |
| 5,599,031 A * | 2/1997 | Hodges | B62B 5/0083 | 280/35 |
| 5,726,368 A * | 3/1998 | Shaw | G10C 3/00 | 84/180 |
| 5,779,252 A * | 7/1998 | Bolton, Jr. | B62B 3/02 | 280/35 |
| 5,785,293 A * | 7/1998 | Ford | F16M 3/00 | 248/676 |
| 5,816,604 A * | 10/1998 | Hsieh | B62B 3/02 | 280/33.997 |
| 5,826,893 A * | 10/1998 | Snoeyenbos | B62B 5/0083 | 280/46 |
| 5,879,014 A * | 3/1999 | Price | B62B 3/04 | 280/47.35 |
| 6,095,533 A * | 8/2000 | Balolia | B60T 1/14 | 188/19 |
| 6,109,625 A * | 8/2000 | Hewitt | F16M 11/18 | 280/43.24 |
| 6,371,496 B1 * | 4/2002 | Balolia | B62B 5/049 | 188/19 |
| 6,419,198 B1 * | 7/2002 | Einav | F16M 11/38 | 248/346.03 |
| 6,439,515 B1 * | 8/2002 | Powers | F16M 13/04 | 248/129 |
| 6,594,856 B1 * | 7/2003 | Cherukuri | B60B 33/0049 | 16/33 |
| 6,783,147 B1 * | 8/2004 | Green, Sr. | B62B 1/20 | D34/12 |
| 7,213,820 B2 * | 5/2007 | Drummond | B60B 33/0005 | 280/79.11 |
| 7,249,738 B2 * | 7/2007 | Kaczorowski | B60B 33/0039 | 248/346.11 |
| 7,478,835 B2 * | 1/2009 | Autenrieth | B66C 23/78 | 280/767 |
| D600,873 S * | 9/2009 | Banasik | D34/23 | |
| 8,317,204 B2 * | 11/2012 | Meers | B62B 3/02 | 280/79.11 |
| 8,567,795 B2 * | 10/2013 | Megens | B62B 3/18 | 280/35 |
| 8,684,372 B2 * | 4/2014 | Buttazzoni | B62B 5/0083 | 280/35 |
| 8,850,656 B2 * | 10/2014 | Bernal | B62B 5/0093 | 16/24 |
| 8,876,145 B1 * | 11/2014 | Bernal | B62B 3/008 | 280/638 |
| 8,944,442 B2 * | 2/2015 | Tsai | B62B 3/02 | 280/655 |
| 9,010,798 B2 * | 4/2015 | Buttazzoni | B62B 3/00 | 280/638 |
| 10,053,129 B1 * | 8/2018 | Turner, Jr. | B62B 5/0083 | |
| 10,427,701 B1 * | 10/2019 | Brede | B62B 3/02 | |
| 10,604,299 B1 * | 3/2020 | Soehnlen | B62B 5/0093 | |
| 11,117,608 B2 * | 9/2021 | Turner, Jr. | B62B 5/0093 | |
| 11,459,046 B1 * | 10/2022 | Popoff | B62B 5/0006 | |
| 12,091,073 B2 * | 9/2024 | Ceja | B62B 5/0086 | |
| 12,187,336 B2 * | 1/2025 | Hanlon | B62B 3/16 | |
| 2004/0173996 A1 * | 9/2004 | Anderson | B62B 5/0083 | 280/651 |
| 2006/0097468 A1 * | 5/2006 | Sugrue | B62B 3/10 | 280/79.11 |
| 2006/0279054 A1 * | 12/2006 | Chung | A45C 13/385 | 280/79.11 |
| 2007/0029747 A1 * | 2/2007 | Islo | B60F 3/0069 | 280/47.35 |
| 2007/0102599 A1 * | 5/2007 | Lin | B62B 5/0083 | 248/129 |
| 2009/0212514 A1 * | 8/2009 | Moorman, Jr. | B25H 5/00 | 280/32.6 |
| 2009/0236809 A1 * | 9/2009 | Carver | B60T 1/14 | 280/43.12 |
| 2020/0130719 A1 * | 4/2020 | Saeli | B62B 3/02 | |
| 2023/0052331 A1 * | 2/2023 | Hung | F16M 11/42 | |
| 2025/0360962 A1 * | 11/2025 | Choi | B62B 3/02 | |

* cited by examiner

MOVABLE BRACKET

CROSS-REFERENCE TO RELATED APPLICATIONS

This application claims the benefit and priority to Chinese Patent Application No. 2025223466989, filed on Nov. 5, 2025. The DAS code for the priority application is 58EE.

TECHNICAL FIELD

The present invention relates to the technical field of handling equipment, in particular to a movable bracket

BACKGROUND OF THE PRESENT INVENTION

In households, offices, or shopping malls, appliances such as air purifiers, water dispensers, refrigerators, printers, and microwave ovens have become essential. These appliances are typically placed directly on a floor or a desktop, which are inconvenient to move when cleaning, especially for heavy appliances, which are laborious and easy to scratch the floor or the desktop.

However, a size of a supporting platform of an existing movable bracket is usually fixed, which leads to that one movable bracket can only perfectly adapt to one or a few appliances with similar sizes, and is difficult to meet bearing requirements of different appliances. Meanwhile, for households, offices or shopping malls with various sizes of electrical appliances (such as refrigerators, printers, microwave ovens, and the like), purchasing multiple brackets of different sizes is both uneconomical and space-consuming.

SUMMARY OF THE PRESENT INVENTION

The present invention provides a movable bracket, which aims to solve the problem that the sizes of the movable brackets used by the existing electrical appliances mentioned in the background are relatively single, and various electrical appliances with different sizes cannot be moved.

In order to solve the technical problem above, the present invention provides a movable bracket, comprising a supporting mechanism, wherein a bottom part of the supporting mechanism is provided with a universal wheel assembly, the supporting mechanism comprises at least two relatively sliding supporting platforms, and an adjusting mechanism is arranged between every two adjacent supporting platforms to drive the two supporting platforms to approach or move away from each other to adjust a bearing width between the two supporting platforms.

In one embodiment, the adjusting mechanism comprises a telescopic sleeve and a telescopic rod, the telescopic sleeve is slidably arranged on the supporting platform, and the telescopic rod is slidably arranged in the telescopic sleeve to realize width adjustment between two adjacent supporting platforms.

In one embodiment, the supporting platform comprises a supporting framework and a supporting base, the supporting framework is fixedly or detachably installed on the supporting base, and a top end of the supporting framework is provided with a bearing pallet.

In one embodiment, the supporting base is provided with a sliding chute for installing the telescopic sleeve, the sliding chute is provided with limiting blocks along a length direction of the sliding chute, and the limiting blocks are located at both sides of the sliding chute.

In one embodiment, an inner side of a bottom part of the supporting framework is provided with a reinforcing rib, and the reinforcing rib is integrally molded with the supporting framework.

In one embodiment, the universal wheel assembly comprises a universal wheel installing base and a universal wheel, the universal wheel is installed in the universal wheel installing base, and the universal wheel mounting seat is detachably installed at a bottom part of the supporting base.

In one embodiment, an outer layer of the universal wheel installing base is provided with an external thread.

In one embodiment, the movable bracket further comprises an adjustable supporting anchor, the supporting anchor comprises a supporting body, an inner side of the supporting body is provided with an internal thread, the supporting body and the universal wheel installing base are fixed through threaded connection, and the universal wheel is lifted off a ground when the supporting anchor is lowered.

In one embodiment, an outer side of the supporting body is provided with a limiting protrusion, and the bottom part of the supporting base is provided with a stopper matched with the limiting protrusion.

In one embodiment, an anti-skid pad is arranged at a bottom part of the supporting body, and the anti-skid pad is made of one of a rubber or a silica gel.

According to the movable bracket above, the supporting mechanism, the universal wheel assembly and the adjusting mechanism are cooperatively arranged, the supporting mechanism comprises the at least two relatively sliding supporting platforms, and the width of the supporting platforms is adjusted by the adjusting mechanism, so that the movable bracket is adapted to electrical appliances with different widths and sizes, thus achieving an effect of one bracket for multi-purposes, reducing a purchase cost of a user, having strong practicability, satisfying bearing requirements of different electrical appliances, and bringing a better use experience to the user.

10—movable bracket, 100—supporting mechanism, 110—supporting platform, 111—supporting framework, 1111—first clamping buckle, 1112—first clamping groove, 1113—first screw hole, 1114—reinforcing rib, 112—supporting base, 1121—second clamping buckle, 1122—second clamping groove, 1123—second screw hole, 1124—third clamping groove, 1125—sliding chute, 1126—limiting block, 1127—limiting piece, 11271—first abutting surface, 11272—second abutting surface, 11273—third abutting surface, 11274—fourth abutting surface, 113—bearing pallet, 200—universal wheel assembly, 210—universal wheel installing base, 211—third clamping buckle, 220—universal wheel, 300—adjusting mechanism, 310—telescopic sleeve, 311—first telescopic sleeve, 312—second telescopic sleeve, 320—telescopic rod, 400—supporting anchor, 410—supporting body, 411—limiting protrusion, 412—stopper, and 420—anti-skid pad.

DETAILED DESCRIPTION OF PREFERRED EMBODIMENTS

In order to make the above objects, features and advantages of the present invention be more clearly understood, the specific embodiments of the present invention will be described in further detail below with reference to the drawings. Numerous specific details are set forth in the following description to facilitate a thorough understanding of the present invention. However, the present invention can be implemented in many other ways different from those described herein, and those skilled in the art can make similar improvements without violating the connotation of the present invention, so the present invention is not limited by the specific embodiments disclosed below.

It should be noted that when an element is considered to be "connected" to another element, it may be directly connected to another element or there may be an intermediate element at the same time. Conversely, when an element is said to be "directly" connected to another element, there are no intermediate elements.

Unless otherwise defined, all the technical and scientific terms used herein have the same meaning as commonly understood by those skilled in the technical field of the present invention. Terms used herein in the specification of the present invention are for the purpose of describing the embodiments of the present invention only and are not intended to limit the present invention. As used herein, the term "and/or" includes any and all combinations of one or more related listed items.

Figure 1:
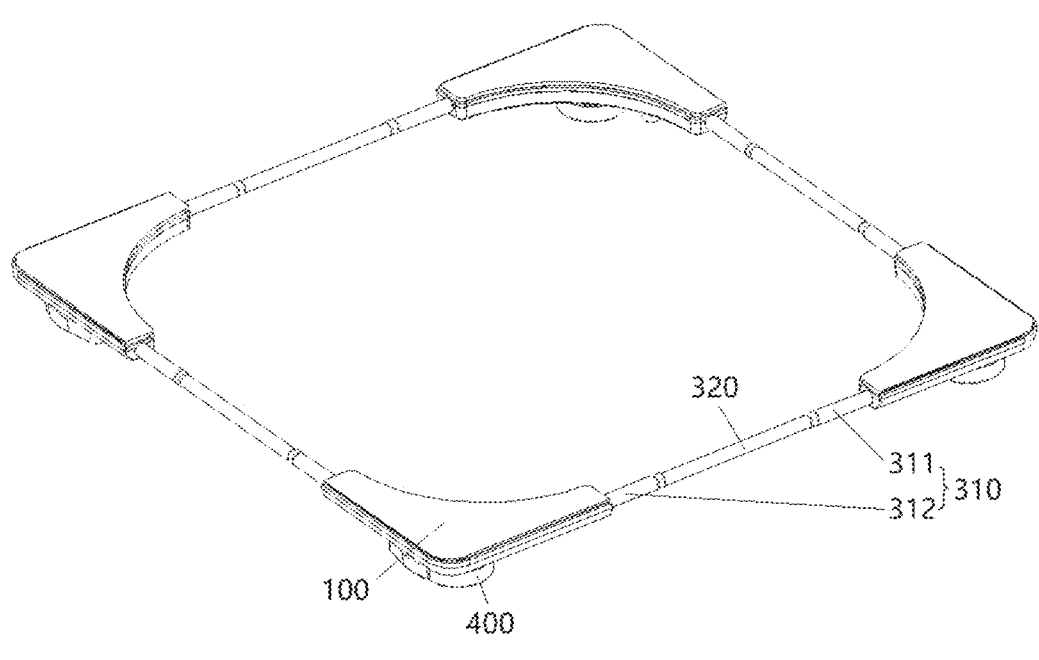
FIG. 1 is a schematic structure diagram of a movable bracket in an unfolded state according to the present invention.
Figure 6:
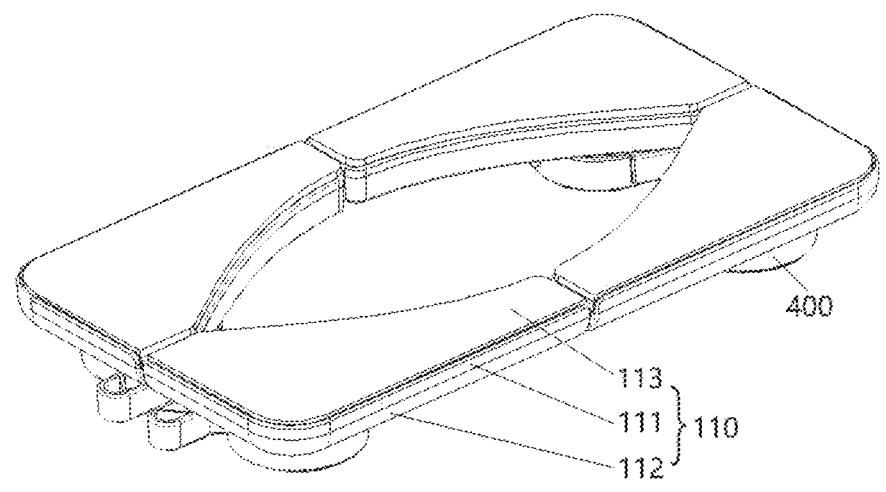
FIG. 6 is a schematic structure diagram of the movable bracket in a storage state according to the present invention.

As shown in FIG. 1 and FIG. 6, a movable bracket 10 comprises a supporting mechanism 100. A bottom part of the supporting mechanism 100 is provided with a universal wheel assembly 200, the supporting mechanism 100 comprises at least two relatively sliding supporting platforms 110, and an adjusting mechanism 300 is arranged between every two adjacent supporting platforms 110 to drive the two supporting platforms 110 to approach or move away from each other to adjust a bearing width between the two supporting platforms 110. Specifically, in the present application, four supporting platforms 110 are provided, which are respectively arranged on four corners of the movable bracket 10. When in use, every two opposite supporting platforms 110 move relative to each other by pushing the supporting platforms 110, and meanwhile, the adjusting mechanism 300 extends in a direction of the supporting platforms 110, so that the bearing width of the whole movable bracket 10 may be changed.

Further, the adjusting mechanism 300 comprises a telescopic sleeve 310 and a telescopic rod 320. The telescopic sleeve 310 is slidably arranged on the supporting platform 110, and the telescopic rod 320 is slidably arranged in the telescopic sleeve 310 to realize width adjustment between two adjacent supporting platforms 110. The supporting base 112 is provided with a sliding chute 1125 for installing the telescopic sleeve 310, the sliding chute 1125 is provided with limiting blocks along 1126 a length direction of the sliding chute, and the limiting blocks 1126 are located at both sides of the sliding chute 1125 for limiting a sliding position of the telescopic sleeve 310 to prevent the telescopic sleeve from falling off.

Specifically, the telescopic sleeve 310 comprises a first telescopic sleeve 311 and a second telescopic sleeve 312. The first telescopic sleeve 311 and the second telescopic sleeve 312 are connected by the telescopic rod 320.

In Embodiment 1, it is necessary to increase a width of the bracket, the first telescopic sleeve 311 and the second telescopic sleeve 312 are gradually slid out of the sliding chute 1125 of the supporting platform 110 by pushing the supporting platforms 110 connected to the first telescopic sleeve 311 and the second telescopic sleeve 312, and the width between adjacent supporting platforms 110 is increased to a preset distance. In this case, if the width between the supporting platforms 110 still cannot meet use requirements, the adjacent supporting platforms 110 will continue to be pulled. When the first telescopic sleeve 311 and the second telescopic sleeve 312 abut against the limiting blocks 1126, the first telescopic sleeve 311 and the second telescopic sleeve 312 cannot continue to slide out of the sliding chute 1125, so the first telescopic sleeve 311 and the second telescopic sleeve 312 will continue to be pulled under an action of an external pulling force, so that the first telescopic sleeve 311 and the second telescopic sleeve 312 are gradually pulled out from the telescopic rod 320, and a distance between the first telescopic sleeve 311 and the second telescopic sleeve 312 is increased, and then the width between two adjacent supporting platforms 110 is continuously adjusted. When the first telescopic sleeve 311 and the second telescopic sleeve 312 are stretched to a preset position, an inner telescopic sleeve limiting part abuts against a telescopic rod limiting part, so that the first telescopic sleeve 311 and the second telescopic sleeve 312 cannot be pulled out from the telescopic rod 320 anymore. In this case, the width between the supporting platforms 110 reaches the maximum.

In Embodiment 2, when it is necessary to increase the width of the bracket, the first telescopic sleeve 311 and the second telescopic sleeve 312 move back and forth by pulling the first telescopic sleeve 311 and the second telescopic sleeve 312 at both ends of the telescopic rod 320. When the first telescopic sleeve 311 and the second telescopic sleeve 312 are stretched to the preset position, the telescopic sleeve limiting part abuts against the telescopic rod limiting part, so that the first telescopic sleeve 311 and the second telescopic sleeve 312 cannot be pulled out from the telescopic rod 320 continuously. In this case, if the width between the supporting platforms 110 cannot meet the use requirements, the supporting platforms 110 connected to the first telescopic sleeve 311 and the second telescopic sleeve 312 are continuously pushed, so that the first telescopic sleeve 311 and the second telescopic sleeve 312 gradually slide out of the sliding chute 1125 of the supporting platform 110 until the first telescopic sleeve 311 and the second telescopic sleeve 312 abut against the limiting blocks 1126. In this case, the width between the supporting platforms 110 reaches the maximum.

Figure 2:
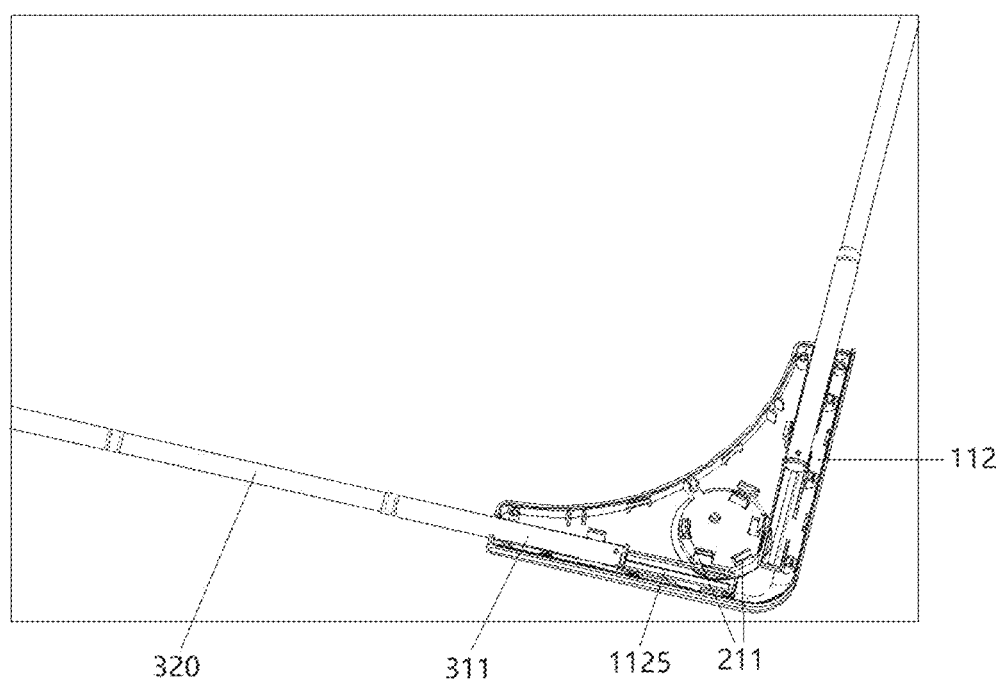
FIG. 2 is a schematic diagram of an inner partial structure of the movable bracket in the unfolded state according to the present invention.
Figure 3:
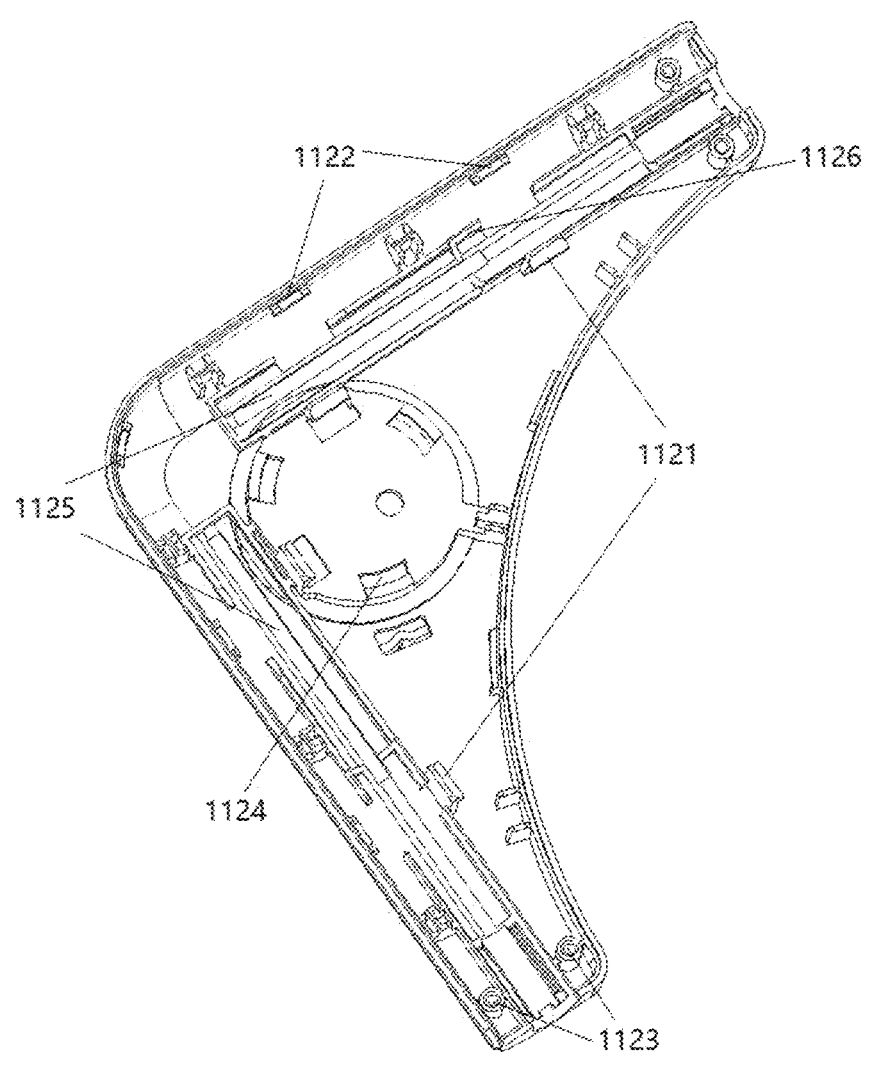
FIG. 3 is a schematic structure diagram of a supporting base of the movable bracket according to the present invention.
Figure 4:
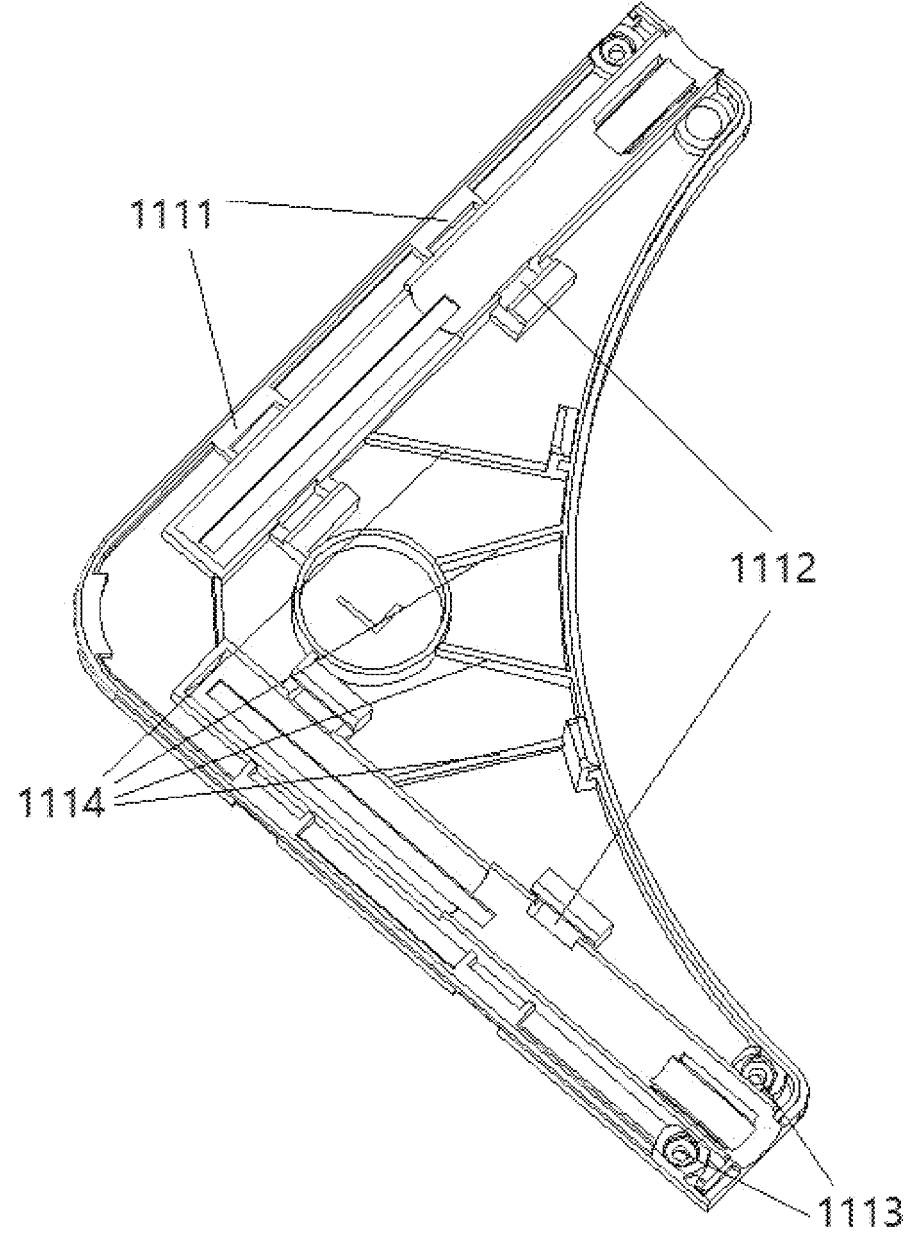
FIG. 4 is a schematic structure diagram of a supporting framework of the movable bracket according to the present invention.

As shown in FIG. 2, FIG. 3 and FIG. 4, further, the supporting platform 110 comprises a supporting framework 111 and a supporting base 112. The supporting framework 111 is fixedly or detachably installed on the supporting base 112. Specifically, the supporting framework 111 is provided with a plurality of first clamping buckles 1111, first clamping grooves 1112 and first screw holes 1113. The supporting base 112 is provided with a plurality of second clamping buckles 1121, second clamping grooves 1122 and second screw holes 1123. The first clamping buckles 1111 are matched with the second clamping grooves 1122, the second clamping buckles 1121 are matched with the first clamping grooves 1112, and the first screw holes 1113 are overlapped with the second screw holes 1123. During installing, the supporting framework 111 and the supporting base 112 may be buckled with each other by dropping the first clamping buckle 1111 into the the second clamping groove 1122 and dropping the second clamping buckle 1121 into the first clamping groove 1112. When the supporting framework 111 and the supporting base 112 are buckled, the first screw hole 1113 and the second screw hole 1123 are overlapped, and then fixed by screw connection. In the present invention, a structure stability and a structure firmness are greatly improved by adding screw fixation on the basis of clamping.

Still further, in order to improve a strength and a toughness of the whole structure, an inner side of a bottom part of the supporting framework 111 is provided with a reinforcing rib 1114, and the reinforcing rib 1114 is integrally molded with the supporting framework 111. By adopting an integral molding process, materials can be effectively saved, a production cost can be reduced and a production efficiency can be improved.

In addition, a top end of the supporting framework 111 is provided with a bearing pallet 113. In the present application, the bearing pallet 113 is made of aluminum alloy. After the production is completed, a microscopic rough surface is formed on the bearing pallet 113 by sandblasting, and then an anodizing treatment is carried out to increase a surface hardness and a wear resistance. Meanwhile, a certain anti-skid effect is provided, which prevents articles from falling off during moving, and improves a safety during use. The bearing pallet 113 may also be made of silica gel material, which may play a certain buffering role when an article is placed on the bracket.

Figure 5:
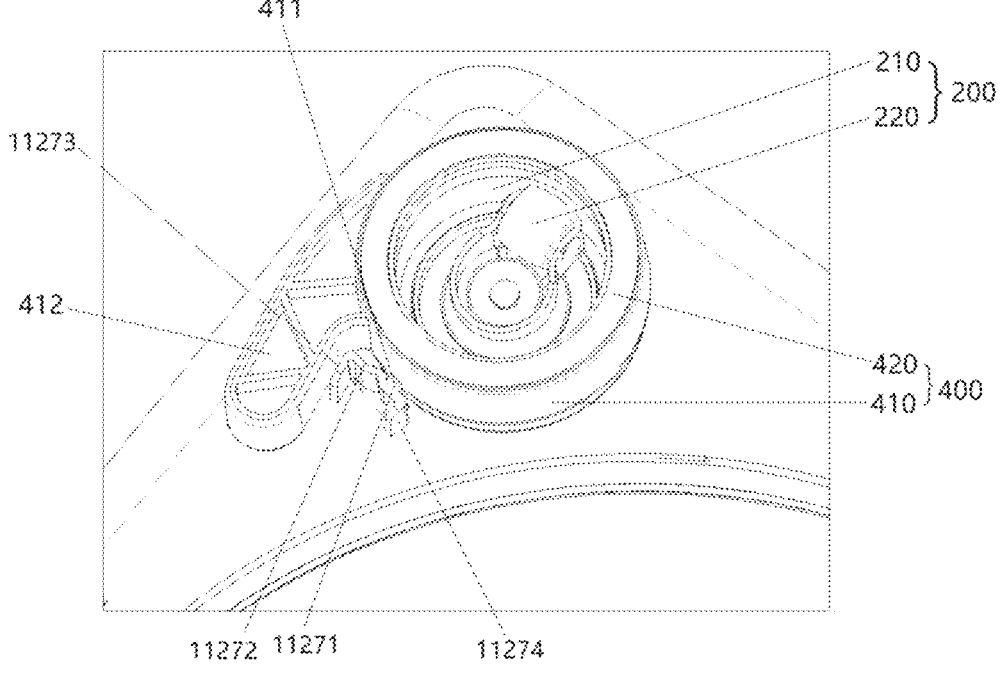
FIG. 5 is a schematic diagram of a back partial structure of the movable bracket in the unfolded state of the present invention.

As shown in FIG. 5, further, the universal wheel assembly 200 comprises a universal wheel installing base 210 and a universal wheel 220. The universal wheel 220 is installed in the universal wheel installing base 210, and the universal wheel mounting seat 210 is detachably installed at a bottom part of the supporting base 112. Specifically, the universal wheel installing base 210 is provided with a plurality of third clamping buckles 211, and the supporting base is provided with a plurality of third clamping grooves 1124. Quantities of the third clamping buckles 211 and the third clamping grooves 1124 are the same and correspond to each other one by one. During installing, connection and fixing may be connected by falling the third clamping buckle 211 into the third clamping groove 1124, thus saving time and labor. The universal wheel 220 is installed inside the universal wheel installing base 210, and the universal wheel installing base 210 may make the universal wheel 220 rotate 360 degrees on a horizontal plane. This design demonstrates that the bracket can be easily moved in any direction without the need to lift and readjust the device, as is required when using a fixed pulley.

Further, the movable bracket 10 further comprises an adjustable supporting anchor 400. The supporting anchor 400 comprises a supporting body 410, an inner side of the supporting body 410 is provided with an internal thread, and an outer layer of the universal wheel installing base 210 is provided with an external thread. The supporting body 410 and the universal wheel installing base 210 are fixed through threaded connection, and the universal wheel 220 is lifted off a ground when the supporting anchor 400 is lowered. When an electric appliance needs to be fixed in a position for a long time (for example, a laundry machine will generate violent vibration during dehydration), the supporting body 410 may be rotated to extend downward until the whole movable bracket 10 is jacked up, so that the universal wheel 220 leaves the ground. In this way, the movable bracket 10 directly contacts the ground through the supporting anchor 400, which not only eliminates a possibility of movement caused by vibration, but also improves a supporting stability.

Further, an anti-skid pad 420 is arranged at a bottom part of the supporting body 410, and the anti-skid pad 420 is made of one of a rubber or a silica gel. The anti-skid pad 420 is used to increase a friction force with the ground or a desktop, and plays a buffering and protecting role, further improving a stability and a safety of the electrical appliance.

Figure 7:
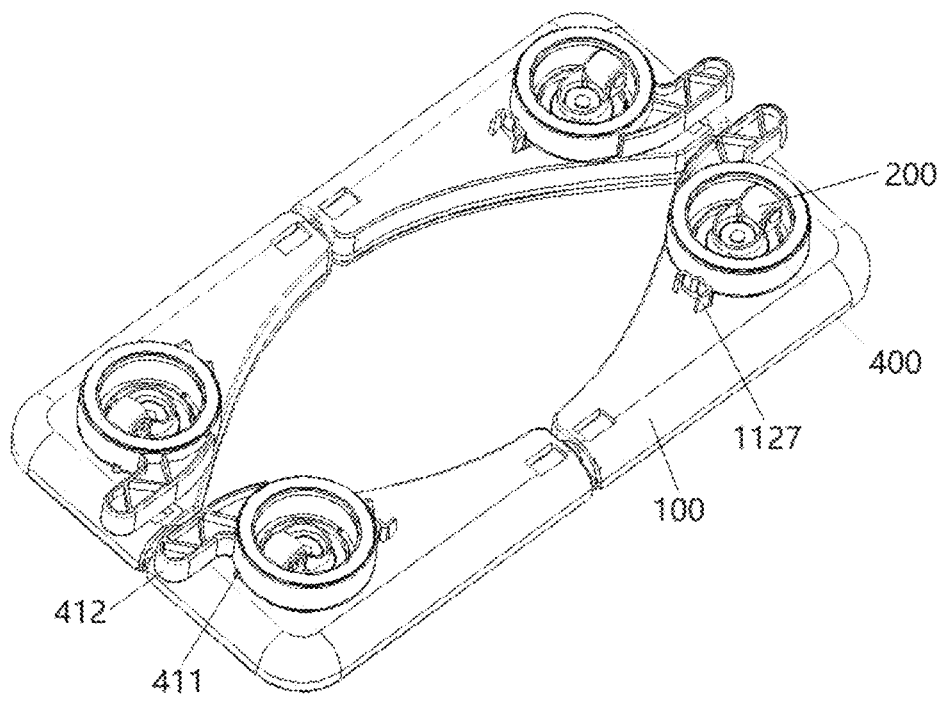
FIG. 7 is a schematic structure diagram of the movable bracket in the storage state according to the present invention from another angle.
Figure 8:
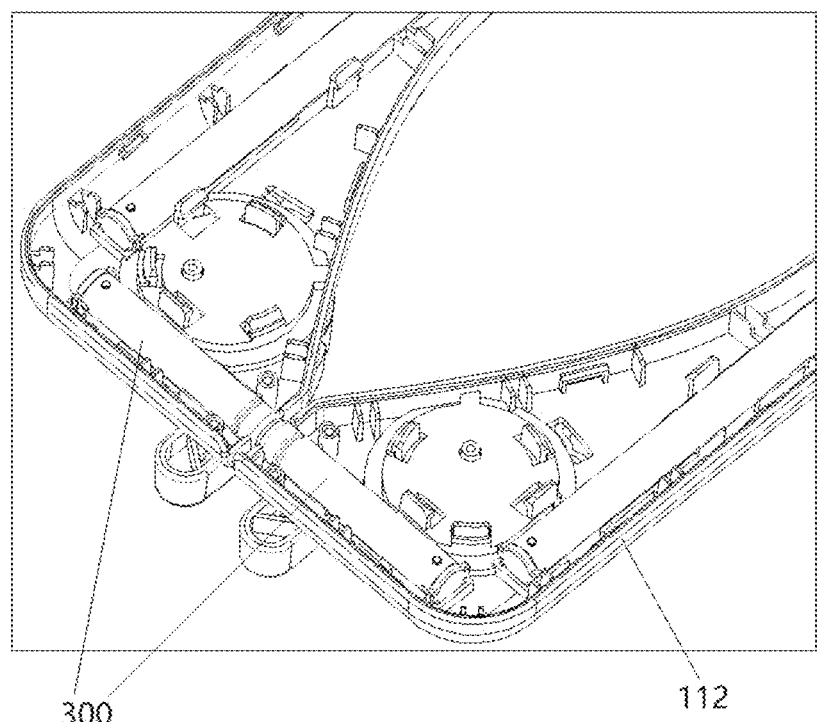
FIG. 8 is a schematic diagram of the inner partial structure of the movable bracket in the storage state according to the present invention.

As shown in FIG. 5, FIG. 7 and FIG. 8, further, an outer side of the supporting body 410 is provided with a limiting protrusion 411 and a stopper 412 matched with the limiting protrusion 411. One side of the supporting base 112 near the supporting body 410 is provided with a limiting piece 1127. When the supporting anchor 400 rotates to a preset position, the limiting protrusion 411 and the stopper 412 respectively abut against the preset position of the limiting piece 1127, so that the supporting anchor 400 cannot continue to rotate. Specifically, the limiting piece 1127 is provided with a first abutting surface 11271, a second abutting surface 11272, a third abutting surface 11273 and a fourth abutting surface 11274. There is a gentle protrusion between the first abutting surface 11271 and the second abutting surface 11272. The first abutting surface 11271 and the second abutting surface 11272 are respectively matched with the limiting protrusion 411, while the third abutting surface 11273 and the fourth abutting surface 11274 are respectively matched with the stopper 412. In the present application, when the bracket needs to be fixed, the supporting body 410 is rotated to get close to the ground. During the rotation of the supporting body 410, the limiting protrusion 411 first slides on the second abutting surface 11272, then slides over the gentle protrusion and enters the first abutting surface 11271. In this case, the stopper 412 abuts against the third abutting surface 11273, and the limiting protrusion 411 abuts against one surface of the gentle protrusion close to the first abutting surface 11271, which has a certain limiting effect on the supporting anchor 400, effectively preventing the supporting anchor 400 from continuing to rotate. In this case, the supporting anchor 400 contacts the ground, and the universal wheel 220 leaves the ground. When the bracket needs to be moved, the supporting body 410 is rotated to move away from the ground, and the limiting protrusion 411 slides over the gentle protrusion from the first abutting surface 11271 and enters the second abutting surface 11272. The stopper 412 and the third abutting surface 11273 are separated from each other until the stopper 412 abuts against the fourth abutting surface 11274, so that the supporting anchor 400 cannot continue to rotate. In this case, the universal wheel 220 contacts the ground.

Figure 9:
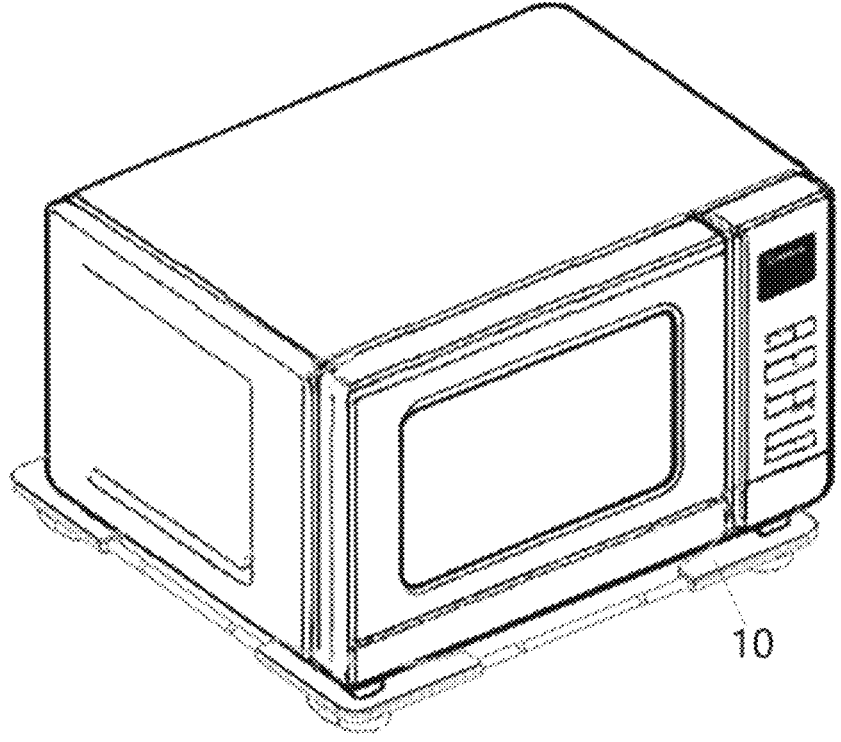
FIG. 9 is a schematic structure diagram of the movable bracket in a usage state according to the present invention.

As shown in FIG. 9, when the present application is in use, a user first adjusts a distance between the supporting platforms 110 according to a width of a bottom part of the electrical appliance, so that a bearing width of the supporting platform is adapted to the width of the bottom part of the electrical appliance, and then lifts the electrical appliance and places the electrical appliance on the bearing pallet 113. When it is necessary to move, the supporting body 410 may be rotated to retract away from the ground until the whole movable bracket 10 is lifted to a preset height, so that the universal wheel 220 can contact the ground, and then the movable bracket can be easily pushed, which saves time and labor. When the movable bracket needs to be parked for a long time, the supporting body 410 is rotated to extend downward until the whole movable bracket 10 is jacked up, so that the universal wheel 220 leaves the ground and is supported by the supporting anchor 400.

When storage is required, the supporting platforms 110 are pushed and pulled inward, so that every two supporting platforms 110 moving relative to each other are close to each other until the telescopic rod 320 is retracted into the telescopic sleeve 310, and meanwhile, the telescopic sleeve 310 is completely slid into the sliding chute 1125, thereby shrinking the whole supporting mechanism 100 and facilitating storage. It should be noted that when in a storage state, the limiting protrusion 411 is away from the limiting piece 1127, and the stopper 412 is close to one side of the other supporting anchor 400, and is arranged opposite to the stopper 412 of the other supporting anchor 400, so that two adjacent supporting anchors 400 are symmetrical with each other, thus reducing an occupied space.

In this way, the movable bracket 10 overcomes limitations of an existing bracket with a fixed width through cooperative arrangement of the supporting mechanism 100, the universal wheel assembly 200 and the adjusting mechanism 300, wherein the supporting mechanism 100 comprises at least two supporting platforms 110 that can slide relative to each other, and the width of the supporting platforms 110 can be adjusted by means of the adjusting mechanism 300, so that the movable bracket can be adapted to electrical appliances with different widths and sizes, and an effect of one bracket for multi-purposes is achieved, a purchase cost of the user is reduced, and a practicability is strong, which can meet the bearing requirements of different electrical appliances and brings a better use experience to the users. In addition, the movable bracket has stable and firm structure, and strong bearing capacity, which improves the safety of the electrical appliance during moving and parking, saves time and labor during moving, does not damage the ground or the desktop, and can meet the needs of the user.

The options in the above method embodiment are also applicable to the embodiment, and will not be described in detail here. The rest of the content of the embodiments of the present invention may refer to the content of the above method embodiment, and will not be repeated in the embodiment.

All the technical features of the above embodiments may be combined at will. In order to make the description concise, not all possible combinations of the technical features in the above embodiments are described. However, as long as there is no contradiction between the combinations of these technical features, they should be considered as the scope recorded in this specification.

The above described embodiments merely represent several embodiments of the present invention, and the description thereof is more specific and detailed, but it should not be understood as a limitation to the patent scope of the present invention. It should be noted that those of ordinary skills in the art may make a plurality of decorations and improvements without departing from the conception of the present invention, and these decorations and improvements shall all fall within the protection scope of the present invention. Therefore, the protection scope of the patent according to the present invention shall be subjected to the claims appended.

I claim:

1. A movable bracket, comprising a supporting mechanism, wherein a bottom part of the supporting mechanism is provided with a universal wheel assembly, the supporting mechanism comprises at least two relatively sliding supporting platforms, and an adjusting mechanism is arranged between every two adjacent supporting platforms to drive the two supporting platforms to approach or move away from each other to adjust a bearing width between the two supporting platforms;

wherein the adjusting mechanism comprises a telescopic sleeve and a telescopic rod, the telescopic sleeve is slidably arranged on the supporting platform, and the telescopic rod is slidably arranged in the telescopic sleeve to realize width adjustment between two adjacent supporting platforms;

wherein the supporting platform comprises a supporting framework and a supporting base, the supporting framework is fixedly or detachably installed on the supporting base, and a top end of the supporting framework is provided with a bearing pallet.

2. The movable bracket according to claim 1, wherein the supporting base is provided with a sliding chute for installing the telescopic sleeve, the sliding chute is provided with limiting blocks along a length direction of the sliding chute, and the limiting blocks are located at both sides of the sliding chute.

3. The movable bracket according to claim 1, wherein an inner side of a bottom part of the supporting framework is provided with a reinforcing rib, and the reinforcing rib is integrally molded with the supporting framework.

4. The movable bracket according to claim 1, wherein the universal wheel assembly comprises a universal wheel installing base and a universal wheel, the universal wheel is installed in the universal wheel installing base, and the universal wheel mounting seat is detachably installed at a bottom part of the supporting base.

5. The movable bracket according to claim 4, wherein an outer layer of the universal wheel installing base is provided with an external thread.

6. The movable bracket according to claim 5, wherein the movable bracket further comprises an adjustable supporting anchor, the supporting anchor comprises a supporting body, an inner side of the supporting body is provided with an internal thread, the supporting body and the universal wheel installing base are fixed through threaded connection, and the universal wheel is lifted off a ground when the supporting anchor is lowered.

7. The movable bracket according to claim 6, wherein an outer side of the supporting body is provided with a limiting protrusion, and the bottom part of the supporting base is provided with a stopper matched with the limiting protrusion.

8. The movable bracket according to claim 7, wherein an anti-skid pad is arranged at a bottom part of the supporting body, and the anti-skid pad is made of one of a rubber or a silica gel.

\* \* \* \* \*